July 25, 1950
J. M. ATOLS
2,516,539
DENTAL FLOSS HOLDER
Filed Oct. 10, 1946
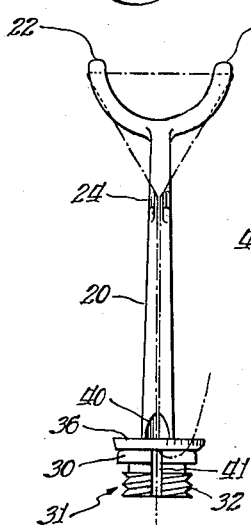
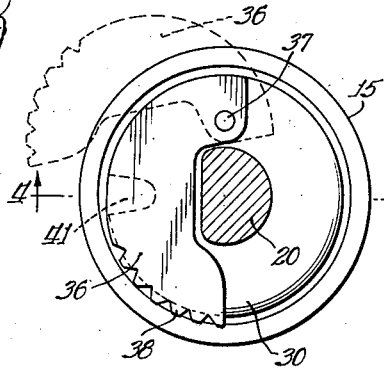
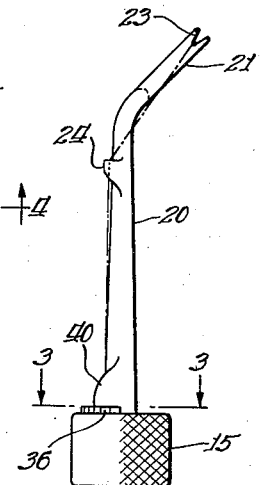
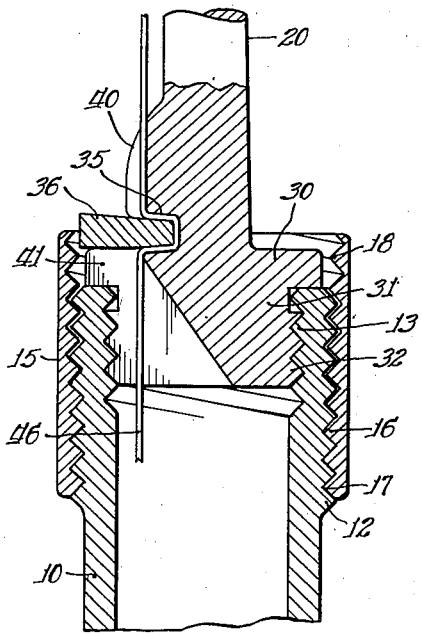
Inventor:
John M. Atols
By: Zabel and Gritzbaugh
Attys.

Patented July 25, 1950

2,516,539

UNITED STATES PATENT OFFICE 2,516,539

DENTAL FLOSS HOLDER

John M. Atols, Chicago, Ill.

Application October 10, 1946, Serial No. 702,554

3 Claims. (Cl. 132—92)

This invention relates to dental floss holders and more particularly to floss holders wherein a length of dental floss is maintained in a convenient position and in a taut manner for use in dental treatment.

An object of the invention is to provide a compact, sanitary, efficient and economical holder wherein a length of dental floss has both its ends placed under firm tension, the floss being unyieldingly held under such tension despite the stresses occasioned by normal use.

Another object contemplates the provision of a holder having a reservoir capable of holding a commercial roll of dental floss so that successive lengths of floss may be readily utilized with the holder.

The invention is characterized in part by the feature that both ends of a length of dental floss are securely clamped in position and are placed under extreme tensile stress. To this end, the holder has a tapered slot and a cooperating tapered arm which is pivoted in such a manner as to be selectively movable into the slot. The two ends of the utilized length of dental floss are aligned across the face of the slot, and the arm is actuated to cause the floss ends to be wedged within the slot. A suitably tapered threaded sleeve is rotated to force the arm farther into the slot, thus to apply extreme tension to the floss ends. This construction serves also to rigidly secure the floss ends so no displacement occurs despite the stressing to which the length of floss is subjected during use.

Other objects and advantages of the invention will be apparent as the description proceeds, reference being had to the accompanying drawing wherein one form of the invention is shown. It is to be understood that the description and drawing are illustrative only, and are not to be taken as limiting the invention except insofar as it is limited in the claims.

In the drawings:

Fig. 1 is a side elevational view of a dental floss holder embodying the invention;

Fig. 2 is an elevational exploded view of the holder;

Fig. 3 is a sectional view on line 3—3 of Fig. 1, and

Fig. 4 is a sectional view on line 4—4 of Fig. 3.

Referring now to the drawing, the holder has a handle 10 in the form of a cylinder, the hollow interior of which is adapted to receive a standard roll of dental floss. The bottom of handle 10 is closed as shown at 11, and the exterior surface at the upper end is provided with threads 12 (Fig. 2). Threads 12 desirably have a substantial pitch, and they also have substantial depth. The interior surface of handle 10 at the upper end is provided with threads 13 (Fig. 4) to receive a presently to be described upper end portion.

A sleeve 15 is associated with handle 10, the sleeve having internal threads 16 (Fig. 4) for association with threads 12 at the upper end of the handle. The internal threads 16 of the sleeve have substantial depth and their internal edges define a tapering surface, the narrow dimension being at the bottom 17 of the sleeve and the wide dimension being at the top 18. The taper has been exaggerated somewhat on the drawing for clarity. The purpose of the taper will be apparent hereinafter.

The holder has an elongated neck 20 extending from handle 10 and terminating in a bifurcated end portion having spaced arms 21 and 22. A notch 23 is provided in the end of each arm. A guide 24 which may consist of two oppositely disposed lugs is provided on neck 20 at the end thereof near the base of arms 21 and 22. As will be seen, the length of dental floss used with the holder extends through guide 24, a notch 23 at the end of one arm, across the space between the two arm ends, through the notch in the end of the other arm and back through the guide 24.

The base of neck 20 has an enlarged flange 30 and a reduced associated portion 31 provided with threads 32 adapted to engage internal threads 13 of handle 10 and thus provide a closure for the upper end of the handle. The periphery of flange 30 is substantially flush with the non-thread external surface of handle 10 as shown in Fig. 4. A slot 35 extends transversely into neck 20 at a point immediately above flange 30. The slot sides taper inwardly so that the narrow dimension of the slot is closest to the neck axis.

A clamping member 36 is pivoted to flange 30 by a pin 37, as best shown in Fig. 3. The member 36 is adapted to engage slot 35 and when so engaged (as shown in the full lines of Fig. 3) at least a portion of the periphery thereof extends somewhat beyond the periphery of flange 30. The portion of the periphery of member 36 which extends beyond the periphery of flange 30 may be serrated, as shown at 38, for ease in manually manipulating the member. The periphery of member 36, particularly in the serrated portion, is provided with an outward taper from the bottom to the top, this taper being adapted to cooperate with the taper of the threaded interior of sleeve 15. These two tapered surfaces are brought into engagement as the sleeve 15 is rotated to move the sleeve upwardly on handle 10, with the result that member 36 is forced inwardly to an extreme position within slot 35 of the neck. The upper and lower surfaces of member 36 which engage slot 35 are tapered as shown in Fig. 4 to cooperate with the taper of the slot.

A floss guide 40 comprising oppositely disposed outstanding lugs is provided on neck 20 immediately above slot 35. A slot 41 (Fig. 4) extends radially inward of flange 30 and associated portion 31 to permit passage of the dental floss from the handle interior.

The above described dental floss holder is arranged for use by moving sleeve 15 to a position on handle 10 somewhat below the top of the handle. As the thread pitch may be substantial, only a small amount of turning is necessary. Neck 20 is rotated to disengage closure portion 31 from the handle in order to permit loading of the handle interior with a roll of dental floss 45 (Fig. 2). The free end 46 (Fig. 4) of the floss is inserted in slot 41, and closure portion 31 is replaced.

The member 36 is pivoted to an outward position (shown by the dotted lines in Fig. 3), and the protruding end 46 of the dental floss is threaded through guide 40, guide 24, a notch 23 in one arm, notch 23 in the other arm, back through guides 24 and 40 to a position below the pivoted member 36. The two floss ends thus extend across the face of slot 35 of neck 20. The member 36 is then pivoted inwardly to bear upon the two ends of the floss and force them into the tapered slot 35. Thereafter, sleeve 15 is screwed upwardly on handle 10 into engagement with the member 36. The tapers on the periphery of member 36 and the interior of sleeve 15 cooperate to force member 36 farther into slot 35.

The tapers of the slot and those on the top and bottom of member 36 cooperate to grip the floss securely and place the ends thereof under extreme tension, thus to maintain the floss extending between arms 21 and 22 in an extremely taut condition. Since the member 36 wedges the floss ends tightly in slot 35, the floss is maintained in its desirably taut condition regardless of the amount of stress imposed upon the floss during normal use, within, of course, the natural yield limit of the floss.

When the exposed portion of the floss has been sufficiently used, a new length of floss is placed in usable position merely by releasing member 36 and withdrawing a new length from roll 45. Thereafter, member 36 is clamped inwardly upon the ends of the new length by proper adjustment of sleeve 15.

From the above description it is thought that the construction and advantages of this invention will be readily apparent to those skilled in the art. Various changes and modifications may be made without departing from the spirit or losing the advantages of the invention.

Having thus described the invention, what I claim as new and desire to secure by Letters Patent is:

1. A dental floss holder comprising a handle having a hollow interior adapted to receive a roll of dental floss, a sleeve around and in threaded engagement with one end of said handle, the interior threaded surface of said sleeve being tapered, a closure for the threaded end of said handle having an opening therethrough for the passage of dental floss, a neck extending from said closure, a pair of spaced arms extending from the neck end away from said closure, floss guides at the free ends of said arms and on said neck, said neck having a transverse slot at the end thereof adjacent said closure, said slot having inwardly tapered sides, a member disposed in interfitting relation with said slot and being adapted to be selectively brought into engagement with said slot, said member having sides tapered for cooperation with the taper of the slot, said member when substantially within said slot extending somewhat beyond the periphery of said closure, the periphery of said member having a taper for cooperation with the taper of said sleeve interior whereby said sleeve may be moved to embrace said member and to force said member to an extreme position within said slot.

2. A dental floss holder comprising a handle having a hollow interior adapted to receive a roll of dental floss, a closure for one end of said handle, a neck extending from said closure, a pair of spaced arms extending from the end of said neck away from said closure, floss guides at the ends of said arms and on said neck, said neck having a transverse slot at the end thereof adjacent said closure, said slot having inwardly tapering sides, a member disposed in interfitting relation with said slot and being adapted to be selectively moved into and out of said slot, the sides of said member being tapered to cooperate with the tapered sides of said slot, said member when substantially within said slot extending somewhat beyond the periphery of said closure, and a sleeve associated with said handle adapted to be moved to embrace said member, said sleeve having a tapered interior whereby movement of said sleeve forces said member to an extreme position within said slot.

3. A dental floss holder comprising a handle, a neck extending from said handle, a pair of spaced arms extending from the end of said neck away from said handle, floss guides at the ends of said arms and on said neck, said neck having a transverse slot therein at the handle end thereof, the sides of said slot being tapered inwardly, a member disposed in interfitting relation with said slot and adapted to be selectively moved into and out of said slot, said member having sides tapered to cooperate with the tapered sides of said slot, and a tapered sleeve associated with said handle and movable to embrace said member to thereby force said member to an extreme position within said slot.

JOHN M. ATOLS.

REFERENCES CITED

The following references are of record in the file of this patent:

UNITED STATES PATENTS

| Number | Name | Date |
|---|---|---|
| 754,841 | Bessonet | Mar. 15, 1904 |
| 844,181 | Overbaugh | Feb. 12, 1907 |
| 1,239,633 | Stickler | Sept. 11, 1917 |
| 1,833,671 | Byars | Nov. 24, 1931 |
| 1,970,575 | Reitzel | Aug. 21, 1934 |